United States Patent
Chen et al.

(10) Patent No.: US 8,372,193 B2
(45) Date of Patent: *Feb. 12, 2013

(54) CELLULOSE-BASED MASTERBATCH WITH IMPROVED BREAKING ELONGATION, APPLICATION THEREOF AND METHOD FOR PREPARING THE SAME

(75) Inventors: Su-Chen Chen, Tu-Chen (TW); Sheng-Jen Lin, Tu-Chen (TW); Nai-Yun Liang, Taipei (TW); Wei-Peng Lin, Sijhih (TW)

(73) Assignee: Taiwan Textile Research Institute, Tu-Chen, Taipei Hsien (TW)

( * ) Notice: Subject to any disclaimer, the term of this patent is extended or adjusted under 35 U.S.C. 154(b) by 0 days.

This patent is subject to a terminal disclaimer.

(21) Appl. No.: 13/454,584

(22) Filed: Apr. 24, 2012

(65) Prior Publication Data

US 2012/0204759 A1 Aug. 16, 2012

Related U.S. Application Data

(62) Division of application No. 12/814,649, filed on Jun. 14, 2010, now Pat. No. 8,188,164.

(30) Foreign Application Priority Data

Mar. 26, 2010 (TW) .............................. 99109147 A

(51) Int. Cl.
| | |
|---|---|
| C08L 1/00 | (2006.01) |
| C09D 101/00 | (2006.01) |
| C09D 4/00 | (2006.01) |
| C09D 201/00 | (2006.01) |
| C09J 101/00 | (2006.01) |
| C09J 4/00 | (2006.01) |
| C09J 201/00 | (2006.01) |
| C08F 251/00 | (2006.01) |

(52) U.S. Cl. ................. 106/170.5; 106/168.01; 527/300
(58) Field of Classification Search ............. 106/168.01, 106/170.5; 527/300
See application file for complete search history.

(56) References Cited

U.S. PATENT DOCUMENTS

| | | | |
|---|---|---|---|
| 2,764,498 A | 9/1956 | Diamond | |
| 3,491,037 A | 1/1970 | Pearman et al. | |
| 3,745,202 A | 7/1973 | Riggleman et al. | |
| 4,051,121 A | 9/1977 | Tcherkinsky et al. | |
| 4,060,970 A * | 12/1977 | Talbot ............................. | 57/205 |
| 4,136,068 A | 1/1979 | Nomura et al. | |
| 4,195,997 A | 4/1980 | Graham | |
| 4,276,173 A | 6/1981 | Kell et al. | |
| 4,362,843 A | 12/1982 | Bahr et al. | |
| 4,395,496 A | 7/1983 | Wittmann et al. | |
| 4,532,277 A | 7/1985 | Wingler | |
| 4,543,221 A | 9/1985 | Chen et al. | |
| 4,565,857 A | 1/1986 | Grant | |
| 4,913,864 A | 4/1990 | Soga et al. | |
| 4,970,247 A | 11/1990 | Hoppe et al. | |
| 5,047,197 A | 9/1991 | Uneback et al. | |
| 5,156,905 A | 10/1992 | Bagrodia et al. | |
| 5,403,485 A | 4/1995 | Dunweg et al. | |
| 5,417,909 A * | 5/1995 | Michels et al. .......... | 264/177.13 |
| 5,480,922 A | 1/1996 | Mulhaupt et al. | |
| 5,693,279 A | 12/1997 | Feuer et al. | |
| 5,707,737 A | 1/1998 | Mori et al. | |
| 5,871,573 A | 2/1999 | Cook et al. | |
| 5,981,738 A | 11/1999 | Cook et al. | |
| 5,985,951 A | 11/1999 | Cook | |
| 6,048,641 A | 4/2000 | Ohmory et al. | |
| 6,068,919 A * | 5/2000 | Ypma et al. ................... | 428/393 |
| 6,093,490 A * | 7/2000 | Meraldi et al. ................ | 428/393 |
| 6,153,136 A | 11/2000 | Collier et al. | |
| 6,248,696 B1 | 6/2001 | Tuominen et al. | |
| 6,261,689 B1 * | 7/2001 | Meraldi et al. ................ | 428/393 |
| 6,303,670 B1 | 10/2001 | Fujino et al. | |
| 6,511,746 B1 | 1/2003 | Collier et al. | |
| 6,582,644 B2 * | 6/2003 | Kim et al. ...................... | 264/188 |
| 6,623,811 B2 | 9/2003 | Shibue et al. | |
| 6,802,869 B2 * | 10/2004 | Kim et al. ..................... | 8/115.51 |
| 6,984,631 B2 | 1/2006 | Aranishi et al. | |
| 7,026,470 B2 | 4/2006 | Obie | |
| 7,244,497 B2 | 7/2007 | Hartmann et al. | |
| 7,854,971 B2 | 12/2010 | Kasahara et al. | |
| 8,062,562 B2 | 11/2011 | Murakami | |
| 8,188,164 B2 * | 5/2012 | Chen et al. ..................... | 523/351 |
| 2002/0102369 A1 | 8/2002 | Shimizu et al. | |
| 2002/0136892 A1 * | 9/2002 | Kim et al. ...................... | 428/364 |
| 2003/0019047 A1 * | 1/2003 | Kim et al. .......................... | 8/125 |
| 2004/0030043 A1 | 2/2004 | Aranishi et al. | |
| 2005/0244365 A1 | 11/2005 | Labib et al. | |
| 2006/0233973 A1 | 10/2006 | Nakamura et al. | |
| 2007/0054143 A1 | 3/2007 | Otoshi | |
| 2007/0222102 A1 * | 9/2007 | Clarkson et al. .............. | 264/130 |
| 2007/0231505 A1 | 10/2007 | Taguchi | |
| 2008/0003443 A1 | 1/2008 | Oya | |
| 2008/0061481 A1 | 3/2008 | Otoshi | |

(Continued)

FOREIGN PATENT DOCUMENTS

| | | |
|---|---|---|
| WO | 94/10238 A1 | 5/1994 |
| WO | 02/075029 A1 | 9/2002 |

*Primary Examiner* — Liam Heincer

(74) *Attorney, Agent, or Firm* — McClure, Qualey & Rodack, LLP

(57) ABSTRACT

Disclosed herein is a thermoplastic cellulosic composition for preparing a cellulose-based masterbatch and/or a fiber with an improved breaking elongation. In one example, the thermoplastic cellulosic composition includes an esterified cellulose present in a range of about 77 wt % to about 95 wt %, polyethylene glycol present in a range of about 4.5 wt % to about 15 wt %, a bifunctional reactant present in a range of about 0.01 wt % to about 3 wt %, an initiator present in a range of about 0.01 wt % to about 0.15 wt %, and a dispersing agent present in a range of about 0.01 wt % to about 5 wt %.

3 Claims, No Drawings

U.S. PATENT DOCUMENTS

| | | |
|---|---|---|
| 2008/0090960 A1 | 4/2008 | Bhattacharya et al. |
| 2008/0118667 A1 | 5/2008 | Kasahara et al. |
| 2008/0213512 A1 | 9/2008 | Nakamura et al. |
| 2009/0023911 A1 | 1/2009 | Hashimoto |
| 2009/0065164 A1* | 3/2009 | Goto et al. .................... 162/231 |
| 2009/0074989 A1 | 3/2009 | Nakamura et al. |
| 2009/0096962 A1 | 4/2009 | Shelton et al. |
| 2009/0122243 A1 | 5/2009 | Sugiyama et al. |
| 2009/0142515 A1 | 6/2009 | Nakamura et al. |
| 2009/0143502 A1 | 6/2009 | Obie |
| 2009/0202822 A1 | 8/2009 | Hasegawa et al. |
| 2009/0268290 A1 | 10/2009 | Fujita |
| 2009/0312535 A1 | 12/2009 | Ueda |
| 2010/0233458 A1 | 9/2010 | Sun et al. |

\* cited by examiner

CELLULOSE-BASED MASTERBATCH WITH IMPROVED BREAKING ELONGATION, APPLICATION THEREOF AND METHOD FOR PREPARING THE SAME

RELATED APPLICATIONS

This is a divisional application of patent application Ser. No. 12/814,649 filed on Jun. 14, 2010, now U.S. Pat No. 8,188,164. The prior application Ser. No. 12/814,649 claims the benefit of Taiwan Patent Application 99109147, filed Mar. 26, 2010, the disclosures of which are incorporated herein by reference in their entirety.

BACKGROUND

1. Field of Invention

The present invention relates to cellulose-based fibers. More particularly, the present invention relates to cellulose-based fibers with an improved breaking elongation.

2. Description of Related Art

Cellulose fibers, or cellulosic fibers, are artificial fibers which were developed as early as the end of the $19^{th}$ century. For example, natural celluloses are treated with a complicated process known as "cuprammonium process" to produce the purified (or regenerated) cellulose; alternatively, natural celluloses are chemically modified to yield the esterified celluloses such as cellulose acetate, and then, cellulose fibers are prepared from the resulting celluloses or cellulose derivatives. In the beginning of the $20^{th}$ century, artificial fibers including rayon and acetate fibers have gained their positions in the market.

However, owing to the soaraway progress of the petrochemical technology, the low-cost and easy-to-produce synthetic fibers, such as nylons and polyester fibers, took the place of the artificial fibers as the mainstream products of the textile industry, by the middle of the $20^{th}$ century.

Recently, the depleting reserves and rising prices of petroleum drive the textile industry to seek fibers other than synthetic fibers. Hence, cellulose-based fibers once again attract the research and development attention.

Conventional methods for preparing cellulose-based fibers include wet spinning, dry spinning and melt spinning.

Both wet spinning and dry spinning processes will use organic solvents such as carbon disulfide and dichloromethane. To prevent those organic solvents from damaging the environment, the solvents must be recycled and thereby inevitably increases the complexity and cost of the processes.

Melt spinning process involves adding a great amount of a low molecular weight plasticizer (molecular weight no greater than 1000 D) in the esterified cellulose to obtain a melt-spinnable composition (masterbatch), which is later melt spun into cellulose-based fibers. Generally, the amount of the plasticizer in the melt-spinnable composition may be 50-90 wt %. However, low-molecular weight plasticizer usually cannot withstand the high spinning temperature (greater than 200° C.) and thereby results in fiber cracking, which in turn lowers the mechanical strength and breaking elongation of the fibers. The breaking elongation of fibers plays an important role in the weaving process. Fibers with poor breaking elongation may break during the winding, and hence, the weaving process would be interrupted. Worse of all, the breaking of the fibers may severely damage the weaving apparatus. The above mentioned disadvantages hinder the melt spun cellulose-based fiber from commercialization.

In view of the foregoing, there exists an urgent need in the related art to provide a novel cellulose-based fiber with an improved breaking elongation and a method for preparing the same.

SUMMARY

The following presents a simplified summary of the disclosure in order to provide a basic understanding to the reader. This summary is not an extensive overview of the disclosure and it does not identify key/critical elements of the present invention or delineate the scope of the present invention. Its sole purpose is to present some concepts disclosed herein in a simplified form as a prelude to the more detailed description that is presented later.

In one aspect, the present invention is directed to a thermoplastic cellulosic composition. According to embodiments of the present invention, the amount of the plasticizer of such composition is substantially lower than that of the conventional art, which may facilitate in improving the physical property of the cellulose-based fiber thus-obtained. Moreover, the masterbatch prepared from such composition is suitable for use in melt spinning process. Unlike wet spinning process, melt spinning process does not require organic solvents and thereby prevents the environmental risk and solvent recycling cost encountered by the wet spinning process. In addition, the cellulose-based fiber prepared therefrom has a breaking elongation of no less than about 25%.

According to one embodiment of the present invention, the thermoplastic cellulosic composition comprises an esterified cellulose in a range of about 77 wt % to about 95 wt %, polyethylene glycol in a range of about 4.5 wt % to about 15 wt %, a bifunctional reactant in a range of about 0.01 wt % to about 3 wt %, an initiator in a range of about 0.01 wt % to about 0.15 wt %, and a dispersing agent in a range of about 0.01 wt % to about 5 wt %.

In another aspect, the present invention is directed to a cellulose-based masterbatch with an improved breaking elongation. The cellulose-based masterbatch is prepared from the thermoplastic cellulosic composition according to the aspect and/or embodiment(s) described hereinabove, and is suitable for use in a melt spinning process for preparing a cellulose-based fiber.

According to one embodiment of the present invention, the cellulose wt % to about based masterbatch comprises about 77 wt % to about 95 wt % of an esterified cellulose, about 4.5 wt % to about 15 wt % of polyethylene glycol, about 0.01 wt % to about 3 wt % of a bifunctional reactant, about 0.01 wt % to about 0.15 wt % of an initiator and about 0.01 wt % to about 5 wt % of a dispersing agent. Each of the bifunctional reactant has two terminals with reactive end-groups (functional groups). The reactive end-groups would become free radicals at high temperature, whereby at least part of the bifunctional reactant has its reactive end-groups respectively connected to the end groups of two esterified cellulose molecules such that the esterified cellulose molecules form a matrix with a continuous phase and the polyethylene glycol molecules distribute across the matrix.

According to embodiments of the present invention, the cellulose-based masterbatch is prepared by a method comprising the steps as follows. First, a thermoplastic cellulosic composition according to the aspect/embodiment(s) described hereinabove is prepared. Then, the composition is compounded at a temperature of about 180-220° C. The compounded composition is granulized to form the cellulose-based masterbatch.

In yet another aspect, the present invention is directed to a cellulose-based fiber with an improved breaking elongation. Accordingly, the cellulose-based fiber exhibits better weavability, and thus is suitable for use in commercial weaving apparatus.

According to one embodiment of the present invention, the breaking elongation of the cellulose-based fiber with an improved breaking elongation is no less than about 28%.

According to one optional embodiment of the present invention, the cellulose-based fiber with an improved breaking elongation has a breaking tenacity that is no less than about 0.8 gf/den.

According to various embodiments of the present invention, the cellulose-based fiber with an improved breaking elongation is prepared from the masterbatch according to the above-mentioned aspect/embodiment(s) of the present invention, and/or prepared by the method according to the above-mentioned aspect/embodiment(s) of the present invention.

Many of the attendant features will be more readily appreciated as the same becomes better understood by reference to the following detailed description.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

The breaking elongation (or elongation at break) is the elongation recorded at the moment of rupture of the fiber and is one of the important factors to determine the flexibility of the fiber. The breaking elongation can be expressed as a percentage of the original length as follows:

$$\text{Breaking elongation (\%)} = (L_f - L_0)/L_0 * 100\%.$$

where, $L_0$ is the original length of the fiber; $L_f$ is the fiber length at break.

Generally, fibers for use in a commercial weaving apparatus (including knitting and plain weaving) should have a breaking elongation of at least 25%. During the weaving and/or winding process, fibers with a breaking elongation less than 25% are likely to break, and hence, the weaving process would be interrupted. Worse of all, the breaking of the fibers may cause severe damage to the weaving apparatus.

In addition to the breaking elongation, the tenacity (or breaking tenacity) of fibers is also relevant to the weavability of fibers. For fibers for use in the commercial weaving apparatus, the tenacity thereof should be about 0.5 g/den in minimum. Hence, both the breaking elongation and the tenacity are important to the commercialization of cellulose-based fibers.

The breaking elongation of the conventional cellulose-based fibers is often less than 20% which may hinder the application of the cellulose-based fibers in the textile industry. In view of that, compositions, masterbatches and methods for preparing cellulose-based fibers with a higher breaking elongation are provided in the present disclosure. In the context of the present invention, a cellulose-based fiber with a breaking elongation greater than 25% is regarded as a cellulose-based fiber with a higher (or improved) breaking elongation. Specifically, the breaking elongation of the fiber according to embodiments of the present invention is at least about 28%; preferably, at least about 36%; more preferably, at least about 45%; and still more preferably, at least about 69%.

It is for the above-mentioned purpose, and with that objective in view, in one aspect, the present invention is directed thermoplastic cellulosic compositions and methods for preparing cellulose-based masterbatch therefrom.

According to embodiments of the present invention, the thermoplastic cellulosic composition comprises an esterified cellulose in a range of about 77 wt % to about 95 wt %, polyethylene glycol in a range of about 4.5 wt % to about 15 wt %, a bifunctional reactant in a range of about 0.01 wt % to about 3 wt %, an initiator in a range of about 0.01 wt % to about 0.15 wt %, and a dispersing agent in a range of about 0.01 wt % to about 5 wt %.

According to embodiments of the present invention, a method for preparing a masterbatch using such thermoplastic cellulosic composition includes the steps as follows. First, a thermoplastic cellulosic composition according to the aspect/embodiment(s) described hereinabove is prepared. Then, the composition is compounded at a temperature of about 180-220° C. The compounded composition is granulized to form the cellulose-based masterbatch.

Specifically, the constituents of the composition are mixed in accordance with the specified weight ratio. Then, the mixed composition is compounded. Generally, the compounding step is carried at a compounding temperature of about 180-220° C.; preferably, at about 180-200° C. For example, the compounding temperature can be about 180, 185, 190, 195, 200, 205, 210, 215 or 220° C. Afterwards, the compounded composition is pelletized to obtain the cellulose-based masterbatch.

In some embodiments, the mixing, compounding and pelletizing steps are all carried out in an extruder. Any customary extruders and extrusion techniques for preparing masterbatches may be employed according to the embodiments of the present invention. A well-known compounding apparatus may include, but is not limited to, a single screw extruder, a twin screw extruder, a multi screw extruder, a brabender, and a kneader.

Alternatively, the mixing, compounding and/or pelletizing steps can be carried out in separate equipments. In one example, the mixing step may be done in any suitable container or mixer, and then, the mixed composition is fed into an extruder for the compounding and pelletizing.

According to the principles and spirits of the present invention, the thermoplastic cellulosic composition adopts a bifunctional reactant. During the compounding step, the two functional groups of the bifunctional reactant may become free radicals and respectively react with the end groups of the backbones of two esterified cellulose molecules. By connecting two esterified cellulose molecules, the chain length of the esterified cellulose molecule may be extended.

In polymers, it is well known that a discontinuous phase across the polymer molecule appears as the level of shorter molecular chain increases. Hence, a longer molecular chain, which is a result of the action of the bifunctional reactant, may help create a continuous phase within the polymer. Regarding the polymers for use in melt spinning process, such continuous phase structure may be an advantageous property, for it may facilitate in improving the flowability and heat-resistance of the polymer.

In addition, the continuous phase structure may also facilitate the mobility of the plasticizer (polyethylene glycol) across the polymer. Hence, according to embodiments of the present invention, the molecular weight of the plasticizer may be higher than the conventionally used plasticizer (that is, those having a molecular weight no greater than 1,000 Da).

For example, the plasticizer can be polyethylene glycol having a molecular weight of about 1,000-20,000 Da. More specifically, the molecular weight of the polyethylene glycol can be about 1,000, 2,000, 3,000, 4,000, 5,000, 6,000, 7,000, 8,000, 9,000, 10,000, 11,000, 12,000, 13,000, 14,000, 15,000, 16,000, 17,000, 18,000, 19,000 or 20,000 Da. Comparing with conventional plasticizer having a molecular weight of 600 or 1.000 Da, the plasticizer having higher molecular weight is more resistant to heat, and hence facilitates in improving the melt-spinnability of the resultant masterbatch.

Moreover, regarding the dispersing condition of the plasticizer across the polymer, polymers with relatively more continuous phase structure are better than polymers with relatively more discontinuous phase structure. Accordingly, lesser amount of the plasticizer in polymers with a relatively more continuous phase structure may achieve equivalent effects of larger amount of plasticizer in polymers with a relatively less continuous phase structure. For example, in the composition according to embodiments of the present invention, the plasticizer may be present in an amount of about 4.5, 5, 5.5, 6, 6.5, 7, 7.5, 8, 8.5, 9, 9.5, 10, 10.5, 11, 11.5, 12, 12.5, 13, 13.5, 14, 14.5 or 15 wt %.

According to the principles and spirits of the present invention, any suitable esterified cellulose may be used in the composition. Examples of the esterified cellulose include, but are not limited to: cellulose acetate, cellulose acetate propionate (CAP), cellulose acetate butyrate (CAB), cellulose acetate pentanoate, cellulose propionate n-butyrate, cellulose acetate laurate and cellulose acetate stearate. In addition, the composition may comprise a mixture consisting of at least two esterified celluloses.

According to one embodiment of the present invention, the esterified cellulose may be cellulose acetate propionate having an esterification ratio no less than about 50%. Cellulose acetate propionate is a cellulose ester wherein the hydroxyl groups of cellulose are substituted with acetyl and propionyl. The term "esterification ratio no less than about 50%" means that the acetyl and propionyl groups together substitute at least about 50% of the hydroxyl groups. Esterified cellulose having an esterification ratio no less than about 50% is suitable for use in thermal processing. Preferably, the esterification ratio of the esterified cellulose is at least about 75%; more preferably, at least about 90%. For example, the esterification ratio of the esterified cellulose may be about 50, 55, 60, 65, 70, 75, 80, 85, 90, 95, 98% or higher.

According to the principles and spirits of the present invention, the thermoplastic cellulosic composition may include any reactant having two functional groups capable of connecting two cellulose molecules. Illustrative examples of bifunctional reactant include, but are not limited to, diallylamine, diallyl trimesate, diallyl cyanurate, diallyl isocynaurate, 4-aminophenyl sulfone, bisphenol A, diallylmelamine, diallyl phosphite, diallyl phthalate (DAP), diallyl sulfide, diallyl succinate (DASu), N,N'-diallyl tartramide (DATA), diaminobenzene, diaminodiethyl sulfide and diaminophenylethylene. For example, diallylamine is used in working examples presented hereinafter.

According to various embodiments of the present invention, the weight percentage of the bifunctional reactant of the thermoplastic cellulosic composition is about 0.01, 0.02, 0.03, 0.04, 0.05, 0.06, 0.07, 0.08, 0.09, 0.1, 0.2, 0.3, 0.4, 0.5, 0.6, 0.7, 0.8, 0.9, 1, 1.1, 1.2, 1.3, 1.4, 1.5, 1.6, 1.7, 1.8, 1.9, 2, 2.1, 2.2, 2.3, 2.4, 2.5, 2.6, 2.7, 2.8, 2.9 or 3 wt %.

The choice of the initiator often depends on the bifunctional reactant to be used. Illustrative examples of initiators include, but are not limited to, potassium persulfate, azobisisobutyronitrile, potassium peroxide and benzyl dimethyl ketal (BDK).

Generally, only a small amount of the initiator is operable to initiate the reaction between the bifunctional reactant and the esterified cellulose. Specifically, the weight percent of the initiator of the thermoplastic cellulosic composition is about 0.01, 0.02, 0.03, 0.04, 0.05, 0.06, 0.07, 0.08, 0.09, 0.1, 0.11, 0.12, 0.13, 0.14 or 0.15 wt %.

The dispersing agent may assist in uniformly distributing the constituents within the thermoplastic cellulosic composition. Generally, the dispersing agent may be $C_{15-38}$ alkanes, $C_{15-38}$ esters, $C_{15-38}$ organic acids, or a mixture thereof. In the working examples presented hereinafter, the composition comprises about 0.01 wt % to about 5 wt % of paraffin as the dispersing agent. Specifically, the dispersing agent of the thermoplastic cellulosic composition is about 0.01, 0.02, 0.03, 0.04, 0.05, 0.06, 0.07, 0.08, 0.09, 0.1, 0.2, 0.3, 0.4, 0.5, 0.6, 0.7, 0.8, 0.9, 1, 1.1, 1.2, 1.3, 1.4, 1.5, 1.6, 1.7, 1.8, 1.9, 2, 2.1, 2.2, 2.3, 2.4, 2.5, 2.6, 2.7, 2.8, 2.9, 3, 3.1, 3.2, 3.3, 3.4, 3.5, 3.6, 3.7, 3.8, 3.9, 4, 4.1, 4.2, 4.3, 4.4, 4.5, 4.6, 4.7, 4.8, 4.9 or 5 wt %.

According to the principles and spirits of the present invention, the amount of the plasticizer used in the composition and/or method presented herein is much lower than that of the conventional art. Accordingly, the melt-spinnability of the masterbatch and the physical properties of the resultant cellulose-based fiber can be improved.

Hence, in another aspect, the present invention is directed to a cellulose-based masterbatch with an improved breaking elongation. The cellulose-based masterbatch is prepared from the thermoplastic cellulosic composition according to the aspect and/or embodiment(s) described hereinabove, and is suitable for use in a melt spinning process for preparing a cellulose-based fiber. Moreover, the breaking elongation of the resultant cellulose-based fiber is greater than 25%.

According to one embodiment of the present invention, the cellulose-based masterbatch comprises about 77 wt % to about 95 wt % of an esterified cellulose, about 4.5 wt % to about 15 wt % of polyethylene glycol, about 0.01 wt % to about 3 wt % of a bifunctional reactant, about 0.01 wt % to about 0.15 wt % of an initiator and about 0.01 wt % to about 5 wt % of a dispersing agent.

In the cellulose-based masterbatch with improved breaking elongation, each of the bifunctional reactant has two terminals with reactive end-groups. The reactive end-groups would become free radicals at high temperature, whereby at least part of the bifunctional reactant has its reactive end-groups respectively connected to the end groups of two esterified cellulose molecules such that the esterified cellulose molecules form a matrix with a continuous phase and the polyethylene glycol molecules distribute across the matrix.

In yet another aspect, the present invention is directed to a melt spinning process for preparing a cellulose-based fiber with an improved breaking elongation. Accordingly, the cellulose-based fiber exhibit better weavability, and thus is suitable for use in commercial weaving apparatus.

According to the principles and spirits of the present invention, the cellulose-based masterbatch of the above-mentioned aspect/embodiment(s) of the present invention is subjected to a melt spinning process, and thereby forms a cellulose-based fiber with improved breaking elongation.

Specifically, in the melt spinning process, suitable spinning temperature is about 200-260° C., for example, about 200, 205, 210, 215, 220, 225, 230, 235, 240, 245, 250, 255 or 260°

C.; suitable spinning speed is about 800-1500 M/min, for example, about 800, 900, 1000, 1100, 1200, 1300, 1400 or 1500 M/min.

According to embodiments of the present invention, when the spinning temperature is about 200-260° C., the apparent viscosity of the molten is about 20-40 Pas. Generally, during the melt spinning process, if the molten achieved an apparent viscosity greater than 40 Pas, risk of molten retention may increase. Accordingly, the spinning apparatus may be damaged due to the higher pressure caused by the retention of the molten. To the contrary, if the molten could not achieve an apparent viscosity of at least 20 Pas, the spinning pressure may be too low to proceed the spinning. Hence, the masterbatch according to the embodiments of the present invention is suitable for use in the melt spinning process.

In still another aspect, the present invention is directed to a cellulose-based fiber with an improved breaking elongation. The cellulose-based fiber may be prepared from the masterbatch, by the method and/or the melt spinning process according to aspects/embodiments of the present invention.

Since the main chains of two esterified cellulose molecules are connected by the terminal end groups of the bifunctional reactant, the length of the molecular chain increases, and a continuous phase structure is created across the polymer. The continuous phase structure may facilitate in improving the flowability and heat-resistance of the polymer, and consequently, the breaking elongation of the resultant cellulose-based fiber is greater than 25%. Accordingly, the cellulose-based fiber exhibit better weavability, and thus is suitable for use in commercial weaving apparatus.

According to embodiments of the present invention, constituents of the cellulose-based fiber with an improved breaking elongation are similar to those of the cellulose-based masterbatch. That is, the cellulose-based fiber may comprise about 77 wt % to about 95 wt % of an esterified cellulose, about 4.5 wt % to about 15 wt % of polyethylene glycol, about 0.01 wt % to about 3 wt % of a bifunctional reactant, about 0.01 wt % to about 0.15 wt % of an initiator and about 0.01 wt % to about 5 wt % of a dispersing agent, wherein at least part of the bifunctional reactant has its two reactive endgroups respectively connected to the molecular chain of two esterified cellulose molecules, whereby the molecular chains form a continuous phase space and the polyethylene glycol molecules distribute across the continuous phase space Some working examples according to embodiments of the present invention are provided hereinafter so as to illustrate the properties of the masterbatch and fiber provided herein.

Briefly, in a twin screw extruder, constituents were mixed with the weight ratios specified in Table 1 to obtain thermoplastic cellulosic compositions of various working examples. Then, the thermoplastic cellulosic compositions were compounded in the twin screw extruder at a temperature of about 180-200° C. to allow the bifunctional reactant to react with the esterified cellulose molecules. After the compounding step, the compounded composition may be granulized to form a plurality cellulose-based masterbatch.

For example, in working example 1, about 87 wt % of cellulose acetate propionate (CAP), about 12 wt % of polyethylene glycol (PEG), about 0.5 wt % of diallylamine, about 0.45 wt % of paraffin and about 0.05 wt % of benzyl dimethyl ketal (BDK) were mixed to obtain the thermoplastic cellulosic composition. The composition were than compounded and granulized to produce the masterbatch of working example 1.

In order to investigate whether or not the resultant masterbatch is suitable for use in the melt spinning process, the masterbatch was subjected to thermogravimetric analysis to determine the onset temperature of the pyrolysis (Onset Temp.). Result of the thermogravimetric analysis is summarized in Table 1.

In addition, cellulose-based fibers were prepared from the masterbatch of the working examples with a melt spinning process, where the spinning temperature is about 240° C., and the spinning speed is about 1500 m/min.

The fibers were further tested by a tensile strength tester in accordance with the procedure set forth in ASTM D2256 (Standard Test Method for Tensile Properties of Yarns by the Single-Strand Method) to determine the breaking elongation (Elongation) and breaking tenacity (Tenacity) of the fibers. Results of the analysis are summarized in Table 1.

TABLE 1

|  | Working example 1 | Working example 2 | Working example 3 | Working example 4 | Comparative example |
|---|---|---|---|---|---|
| CAP (wt %) | 87 | 86.5 | 87.2 | 87 | 87 |
| PEG (wt %) | 12 | 12 | 12 | 12 | 12 |
| Bifunctional group reactant (wt %) | Diallylamine 0.5 | Diallylamine 1.0 | Diallylamine 0.3 | Bisphenol A 0.5 | No |
| Paraffin (wt %) | 0.45 | 0.45 | 0.45 | 0.45 | 0.45 |
| BDK (wt %) | 0.05 | 0.05 | 0.05 | 0.05 | 0.05 |
| Onset Temp. (° C.) | 190 | 210 | 180 | 190 | 170 |
| Elongation (%) | 45 | 69 | 28 | 36 | 17 |
| Tenacity (g/den) | 0.93 | 0.8 | 0.9 | 0.88 | 0.72 |

As table 1 shows, the fiber of the comparative example has a breaking elongation of 17%; by comparison, the breaking elongation of each of the fibers of working examples 1-4 is 45%, 69%, 28%, and 36%, respectively. Hence, the breaking elongation of the cellulose-based fiber provided herein is much higher than that of the conventional cellulose-based fiber. For example, breaking elongation of the working example 2 is 69%, which is three times more than the breaking elongation of the comparative example (17%). In view of the foregoing, the breaking elongation of the cellulose-based fiber with improved breaking elongation according to embodiments of the present invention is no less than 28%; preferably, no less than 36%; more preferably, no less than 45%; still more preferably, no less than 69%.

In addition, as can be seen in Table 1, the cellulose-based fibers provided herein also exhibit better breaking tenacity, as compared with the fiber of the comparative example. Specifically, the breaking tenacity of fibers of working examples 1-4 are 0.93, 0.8, 0.9 and 0.88 g/den, respectively; hence, the cellulose-based fiber according to one embodiment of the present invention has a breaking tenacity no less than about 0.8 gf/den.

The fiber of working example 1 was weaved using commercial weaving apparatus. The weaving process continued for more than half an hour without filament break. Also, both plain weave and pique weave were successfully produced.

It will be understood that the above description of embodiments is given by way of example only and that various modifications may be made by those with ordinary skill in the art. The above specification, examples and data provide a complete description of the structure and use of exemplary embodiments of the invention. Although various embodiments of the invention have been described above with a certain degree of particularity, or with reference to one or more individual embodiments, those with ordinary skill in the art could make numerous alterations to the disclosed embodiments without departing from the spirit or scope of this invention.

What is claimed is:

1. A cellulose-based fiber having a breaking elongation no less than about 28%, wherein the cellulose-based fiber is prepared from a cellulose-based masterbatch comprising:
   about 77 wt % to about 95 wt % of a esterified cellulose;
   about 4.5 wt % to about 15 wt % of a polyethylene glycol;
   about 0.01 wt % to about 3 wt % of a bifunctional reactant;
   about 0.01 wt % to about 0.15 wt % of an initiator; and
   about 0.01 wt % to about 5 wt % of a dispersing agent,
      wherein each of the bifunctional reactant has two terminal reactive end-groups, and at least part of the bifunctional reactant has its two reactive end-groups respectively connected to the molecular chain of two esterified cellulose molecules such that the esterified cellulose molecules form a matrix with a continuous phase and the polyethylene glycol molecules distribute across the matrix.

2. The cellulose-based fiber of claim 1, wherein the cellulose-based fiber has a breaking tenacity no less than about 0.8 gf/den.

3. The cellulose-based fiber of claim 1, wherein the cellulose-based fiber is prepared by the steps of:
   preparing the cellulose-based masterbatch; and
   melt spinning the cellulose-based masterbatch at a spinning temperature of about 200-240° C. and a spinning speed of about 800-1500 m/min.

* * * * *